(12) United States Patent
Kothari et al.

(10) Patent No.: US 8,149,496 B2
(45) Date of Patent: Apr. 3, 2012

(54) INTEGRATED TOUCH FOR IMOD DISPLAYS USING BACK GLASS

(75) Inventors: Manish Kothari, Cupertino, CA (US);
Bangalore Ramaswamiengar Natarajan, Cupertino, CA (US); Alok Govil, Santa Clara, CA (US);
Kristopher Andrew Lavery, San Jose, CA (US); Lauren Fay Palmateer, San Francisco, CA (US); Jonathan Charles Griffiths, Fremont, CA (US)

(73) Assignee: Qualcomm Mems Technologies, Inc., San Diego, CA (US)

( * ) Notice: Subject to any disclaimer, the term of this patent is extended or adjusted under 35 U.S.C. 154(b) by 0 days.

(21) Appl. No.: 12/645,379

(22) Filed: Dec. 22, 2009

(65) Prior Publication Data
US 2011/0149375 A1    Jun. 23, 2011

(51) Int. Cl.
*G02B 26/00* (2006.01)
*G02B 26/08* (2006.01)

(52) U.S. Cl. ......... 359/291; 359/237; 359/298; 359/302

(58) Field of Classification Search .......... 359/290–292, 359/295, 223–225, 245, 260–263, 298, 198, 359/301–303, 317–318, 237, 242
See application file for complete search history.

(56) References Cited

U.S. PATENT DOCUMENTS

| | | | |
|---|---|---|---|
| 3,593,115 A | 7/1971 | Dym et al. | |
| 7,138,984 B1 | 11/2006 | Miles | |
| 7,477,445 B2 | 1/2009 | Lee | |
| 7,911,456 B2 * | 3/2011 | Gillespie et al. | 345/174 |
| 2005/0254115 A1 * | 11/2005 | Palmateer et al. | 359/276 |
| 2006/0044928 A1 | 3/2006 | Chui et al. | |
| 2006/0067651 A1 | 3/2006 | Chui | |
| 2007/0075942 A1 | 4/2007 | Martin et al. | |
| 2007/0139655 A1 | 6/2007 | Luo | |
| 2007/0296691 A1 | 12/2007 | Sampsell | |
| 2008/0278798 A1 | 11/2008 | Hagagood et al. | |
| 2008/0316566 A1 * | 12/2008 | Lan | 359/237 |
| 2009/0033522 A1 | 2/2009 | Skillman et al. | |
| 2009/0195518 A1 | 8/2009 | Mattice et al. | |
| 2010/0149127 A1 * | 6/2010 | Fisher et al. | 345/174 |

FOREIGN PATENT DOCUMENTS

EP    1630781    3/2006

OTHER PUBLICATIONS

Liao, Chun-da, and Tsai, Jui-che, "The Evolution of MEMS Displays," *IEEE Transactions on Industrial Electronics*, vol. 56, No. 4, Apr. 2009. 9 pgs.
Inventec V1112 Smartphone, http:mirasoldisplays.com/mirasol-applications/products_invetec.php, Downloaded Jun. 12, 2009. 2 pgs.

(Continued)

*Primary Examiner* — Dawayne A Pinkney
(74) *Attorney, Agent, or Firm* — Weaver Austin Villeneuve & Sampson LLP

(57) ABSTRACT

An interferometric modulator ("IMOD") display utilizes ambient light and incorporates touch sensing without reducing the amount of ambient light that reaches the MEMS modulators, and without introducing any optical distortion or loss of performance. Electrodes for touch sensing are located at a back glass of the inteferometric display, and are used in conjunction with electrodes whose primary function is to activate the pixels of the MEMS display, in order to sense a touch. The touch deflects the IMOD layers and is sensed through the various display layers at the rear of the display.

24 Claims, 12 Drawing Sheets

OTHER PUBLICATIONS

Invitation to Pay Additional Fees and, Where Applicable, Protest Fee dated Feb. 23, 2011, from Application No. PCT/US2010/060584.

International Search Report and Written Opinion mailed May 13, 2011, from Application No. PCT/US2010/060584.

* cited by examiner

INTEGRATED TOUCH FOR IMOD DISPLAYS USING BACK GLASS

BACKGROUND OF THE INVENTION

Description of Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF THE INVENTION

An interferometric modulator ("IMOD") display utilizes ambient light and incorporates touch sensing without reducing the amount of ambient light and creating any optical distortion or loss of performance. Electrodes for touch sensing are located at a rear substrate or "back glass" of the inteferometric display, and are used in conjunction with electrodes whose primary function is to activate the pixels of the MEMS display, in order to sense a touch. The touch deflects the IMOD layers and is sensed through the various display layers at the rear of the display.

One aspect relates to a method of making and operating an interferometric display apparatus. The method comprises: providing a front substrate at a front of the display, the front substrate being substantially transparent; providing a rear substrate at a rear of the display, the rear substrate being substantially transparent; and providing an array of interferometric modulation elements disposed between the front and rear substrates. The array is disposed on the front substrate at the front of the display, and the interferometric modulation elements comprise two walls that define a cavity, one of the walls being movable relative to the other through a range of positions, the walls causing the cavity to operate interferometrically in at least one of the positions, producing a predetermined optical response to visible light. The method further comprises providing a first plurality of electrodes oriented along a first axis and configured for conducting electrical signals to the array of interferometric modulation elements, the first plurality of electrodes in contact with the rear substrate; providing a second plurality of electrodes oriented along a second axis substantially orthogonal to the first axis; utilizing one or both of the first or second plurality of electrodes as plates of a touch screen, and sensing a change in a parameter generated by a touch at the intersection between the electrodes of the first and second plurality.

In certain embodiments, the parameter comprises a capacitance value and the method further comprises computing a centroid of a capacitance change. The method may also further comprise referencing a stored map of centroid capacitance change vs. intersection data and determining the location of the touch.

Another aspect relates to an apparatus, comprising: a first substantially transparent substrate; and an array of interferometric modulation elements disposed on the first substantially transparent substrate, the interferometric modulation elements comprising two walls that define a cavity, one of the walls being movable relative to the other through a range of positions, the walls causing the cavity to operate interferometrically in at least one of the positions, producing a predetermined optical response to visible light. The apparatus further comprises a first plurality of electrodes configured for conducting electrical signals to the array of interferometric modulation elements; first control circuitry configured to apply electrical signals for controlling the array of interferometric modulation elements via the first plurality of electrodes; a second substrate; a second plurality of electrodes disposed on the second substrate; and second control circuitry configured to detect capacitance changes between the first plurality of electrodes and the second plurality of electrodes and to determine a deflected area of the first substantially transparent substrate based, at least in part, on the capacitance changes.

A further understanding of the nature and advantages of the present invention may be realized by reference to the remaining portions of the specification and the drawings.

DETAILED DESCRIPTION OF THE PREFERRED EMBODIMENTS

Interferometric Modulator

The following detailed description is directed to certain specific embodiments. However, the teachings herein can be applied in a multitude of different ways. In this description, reference is made to the drawings wherein like parts are designated with like numerals throughout. The embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

An interferometric modulator ("IMOD") display utilizes ambient light and incorporates touch sensing without reducing the amount of ambient light that reaches the MEMS modulators, and without introducing any optical distortion or loss of performance. Electrodes for touch sensing are located at a back glass of the inteferometric display, and are used in conjunction with electrodes whose primary function is to activate the pixels of the MEMS display, in order to sense a touch. The touch deflects the IMOD layers and is sensed through the various display layers at the rear of the display. Embodiments of such a display are described below.

Figure 1:
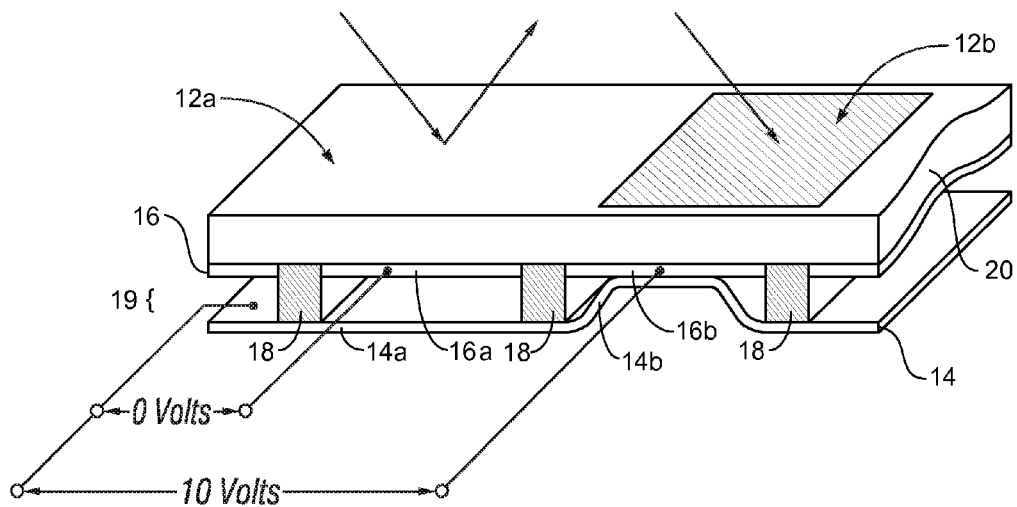
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("relaxed" or "open") state, the display element reflects a large portion of incident visible light to a user. When in the dark ("actuated" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) to form columns deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device. Note that FIG. 1 may not be to scale. In some embodiments, the spacing between posts 18 may be on the order of 10-100 um, while the gap 19 may be on the order of <1000 Angstroms.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential (voltage) difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by actuated pixel 12b on the right in FIG. 1. The behavior is the same regardless of the polarity of the applied potential difference.

FIGS. 2 through 5 illustrate one exemplary process and system for using an array of interferometric modulators in a display application.

Figure 2:
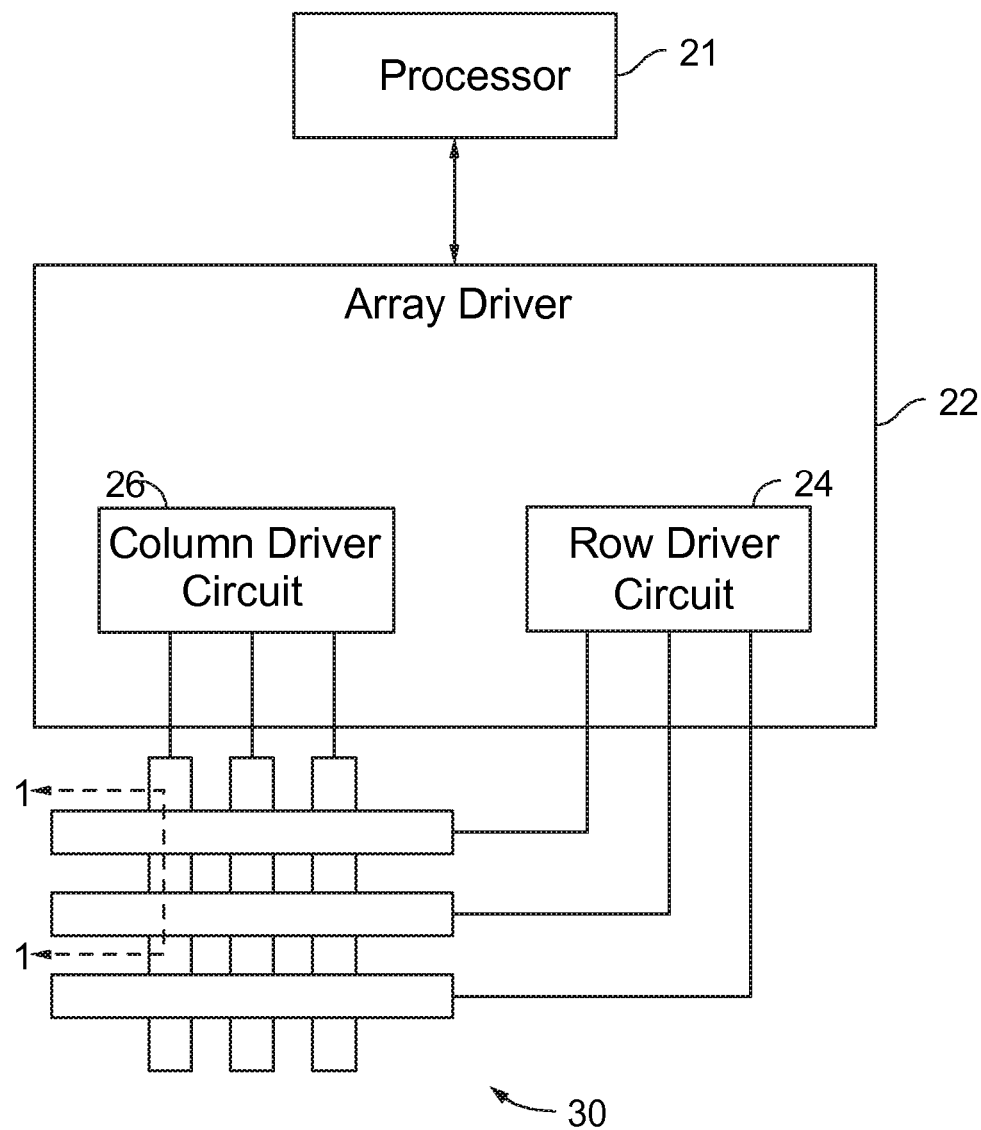
FIG. 2 is a system block diagram illustrating one embodiment of an electronic device incorporating a 3×3 interferometric modulator display.

FIG. 2 is a system block diagram illustrating one embodiment of an electronic device that may incorporate interferometric modulators. The electronic device includes a processor 21 which may be any general purpose single- or multi-chip microprocessor such as an ARM®, Pentium®, 8051, MIPS®, Power PC®, or ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. Note that although FIG. 2 illustrates a 3×3 array of interferometric modulators for the sake of clarity, the display array 30 may contain a very large number of interferometric modulators, and may have a different number of interferometric modulators in rows than in columns (e.g., 300 pixels per row by 190 pixels per column).

Figures 3, 4:
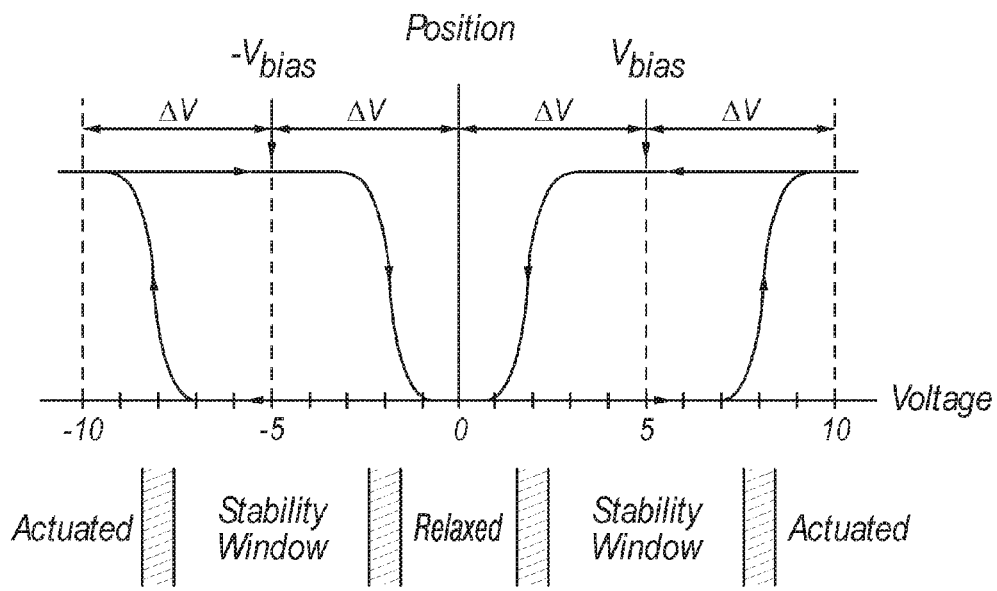
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIG. 3 is a diagram of movable mirror position versus applied voltage for one exemplary embodiment of an interferometric modulator of FIG. 1. For MEMS interferometric modulators, the row/column actuation protocol may take advantage of a hysteresis property of these devices as illustrated in FIG. 3. An interferometric modulator may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state or bias voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

As described further below, in typical applications, a frame of an image may be created by sending a set of data signals (each having a certain voltage level) across the set of column electrodes in accordance with the desired set of actuated pixels in the first row. A row pulse is then applied to a first row electrode, actuating the pixels corresponding to the set of data signals. The set of data signals is then changed to correspond to the desired set of actuated pixels in a second row. A pulse is then applied to the second row electrode, actuating the appropriate pixels in the second row in accordance with the data signals. The first row of pixels are unaffected by the second row pulse, and remain in the state they were set to during the first row pulse. This may be repeated for the entire series of rows in a sequential fashion to produce the frame. Generally, the frames are refreshed and/or updated with new image data by continually repeating this process at some desired number of frames per second. A wide variety of protocols for driving row and column electrodes of pixel arrays to produce image frames may be used.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
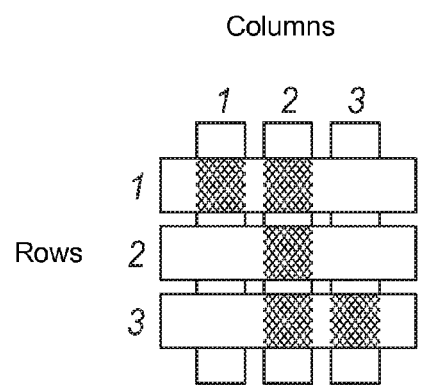
FIGS. 5A and 5B illustrate one exemplary timing diagram for row and column signals that may be used to write a frame of display data to the 3×3 interferometric modulator display of FIG. 2.
Figure 5B:
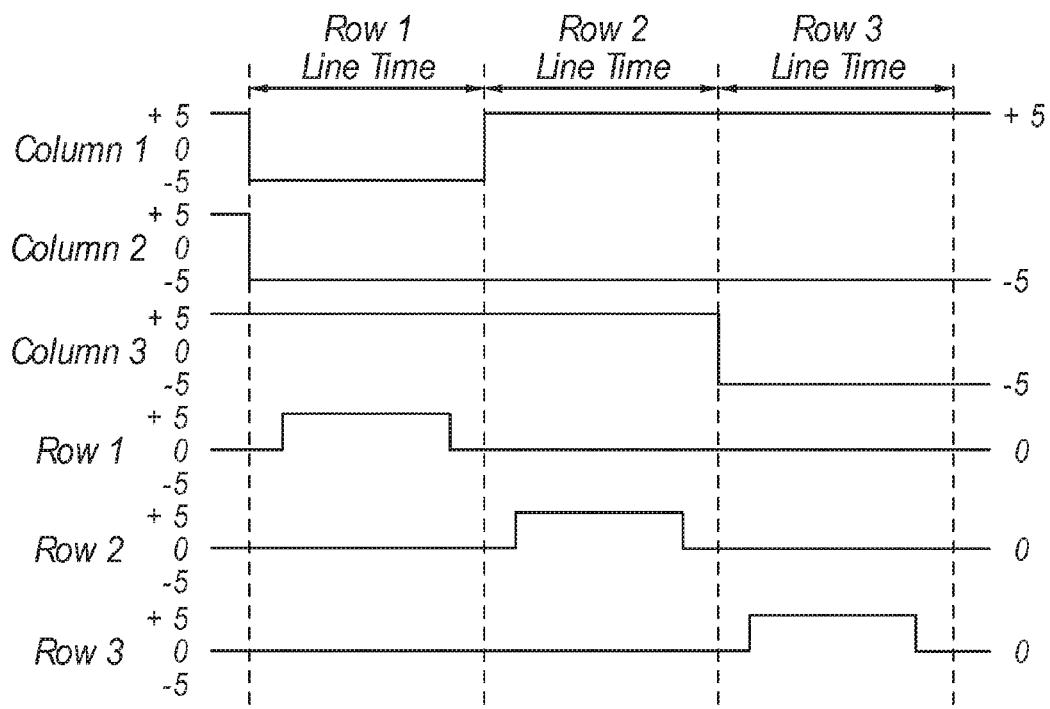

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are initially at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. The same procedure can be employed for arrays of dozens or hundreds of rows and columns. The timing, sequence, and levels of voltages used to perform row and column actuation can be varied widely within the general principles outlined above, and the above example is exemplary only, and any actuation voltage method can be used with the systems and methods described herein.

Figure 6A:
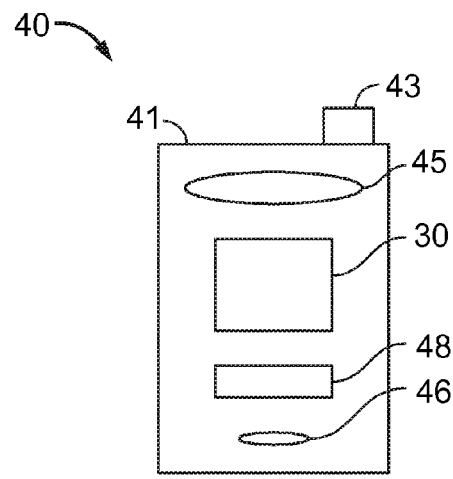
FIGS. 6A and 6B are system block diagrams illustrating an embodiment of a visual display device comprising a plurality of interferometric modulators.
Figure 6B:
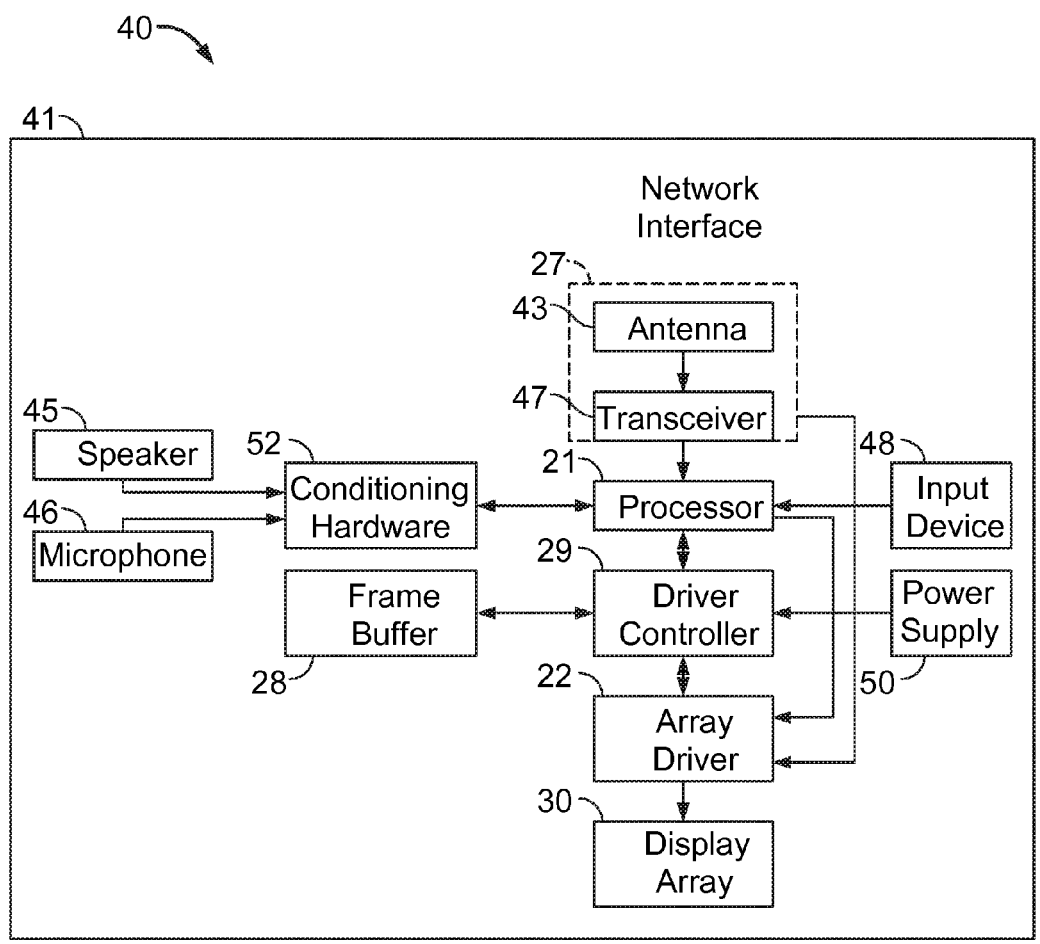

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, W-CDMA, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. The above-described optimization may be implemented in any number of hardware and/or software components and in various configurations.

Figure 7A:
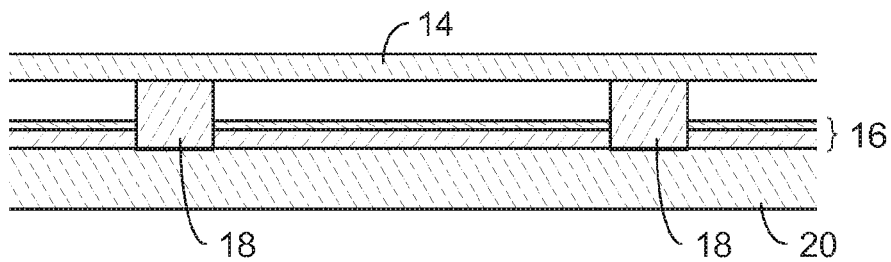
FIG. 7A is a cross section of the device of FIG. 1.
Figure 7B:
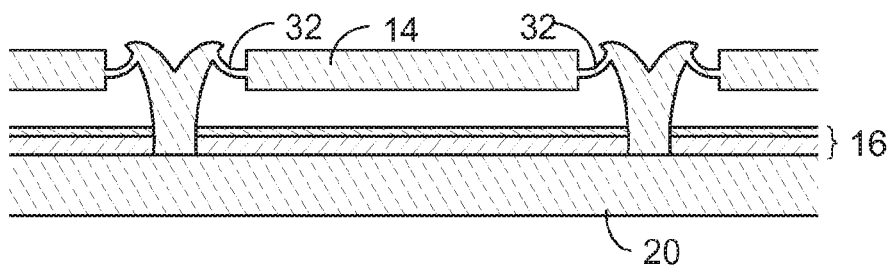
FIG. 7B is a cross section of an alternative embodiment of an interferometric modulator.
Figure 7C:
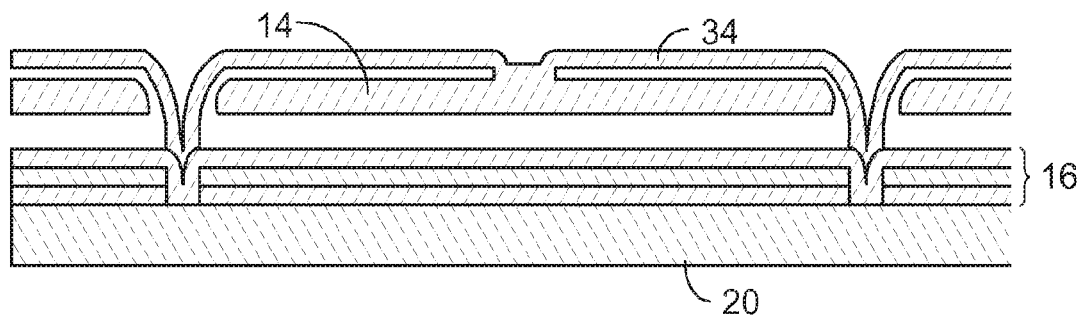
FIG. 7C is a cross section of another alternative embodiment of an interferometric modulator.
Figure 7D:
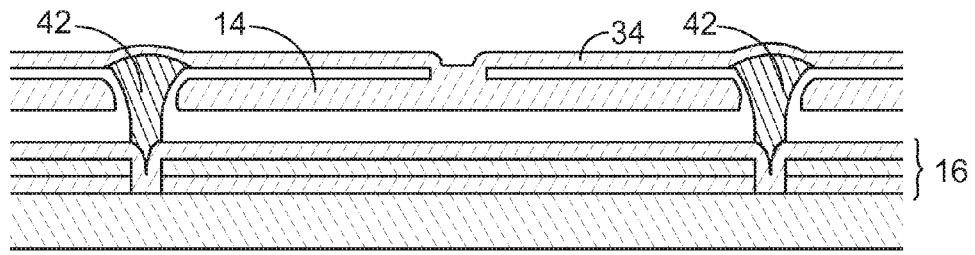
FIG. 7D is a cross section of yet another alternative embodiment of an interferometric modulator.
Figure 7E:
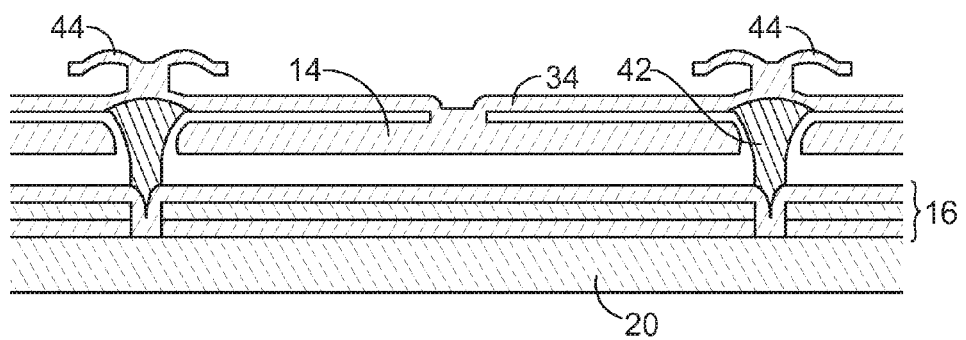
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 of each interferometric modulator is square or rectangular in shape and attached to supports at the corners only, on tethers 32. In FIG. 7C, the moveable reflective layer 14 is square or rectangular in shape and suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. For example, such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Integrated Touch

Figure 8A:
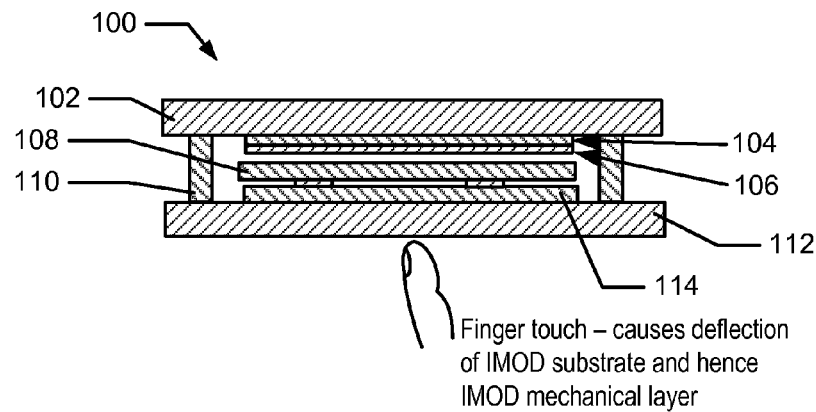
FIGS. 8A, 8B, and 8C are cross sections of an additional alternative embodiment of an interferometric modulator.
Figure 8B:
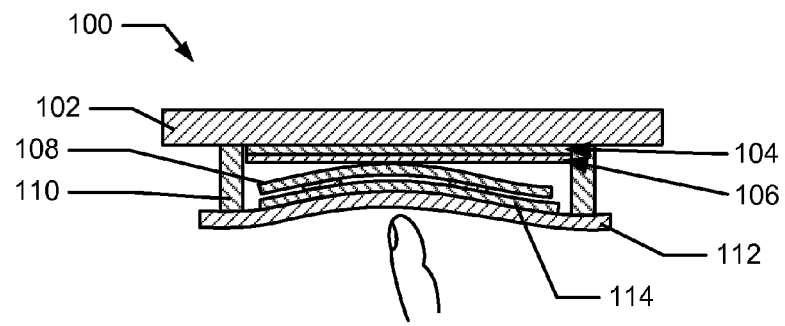

FIG. 8A illustrates components of an IMOD display 100 in an undeflected (equilibrium) position prior to a touch. FIG. 8B illustrates display 100 in a deflected state when touched by an object such as a finger.

An advantage of such an IMOD display is that it is easily read in a variety of lighting situations. For example, while some displays may be washed out and difficult or impossible to read in bright sunlight, the IMOD display is reflective and easily read in bright sunlight. Typically, IMOD display 100 relies on ambient light, although a light source may be integrated at the side of the display. As the display typically relies on ambient light, placing a touch sensitive screen element at the front side (that nearest the user and possible to touch) of the display will lessen the amount of light arriving at the pixels of the display and reflected to the user. Additionally, such a touch screen element may introduce an amount of optical distortion as light rays pass through the element to and from the reflective pixels. Embodiments of the display 100 avoid these drawbacks by integrating an electrode and using that electrode with other elements of the IMOD display to determine the position of a touch.

Figure 8C:
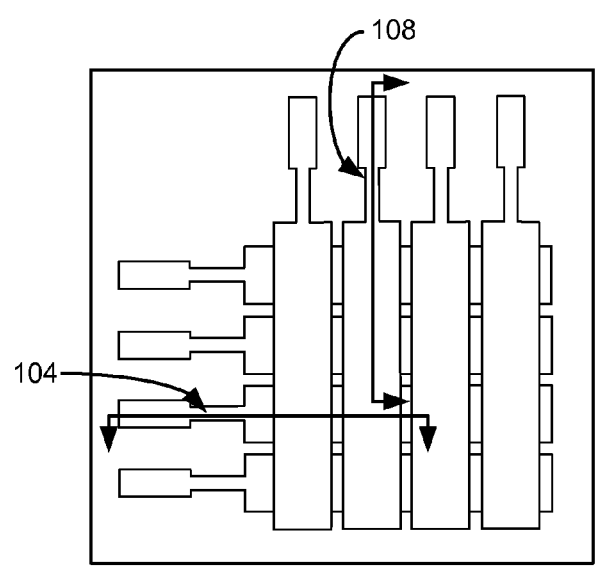

Referring to FIGS. 8A and 8B, the display 100 comprises a rear substrate 102, also referred to as back glass 102, an electrode 104 in contact with the surface of the back glass 102, and an electrode 108 of the mechanical layer. Electrode 108 may be any of the patterned electrode layers of the display, as described above in the previous section entitled Interferometric Modulator. Electrode 108 and other associated layers may hereafter be described as the "mechanical layer." The electrode 104 is patterned in such a way that it is substantially orthogonal to the pattern of an electrode 108 of the mechanical layer of the display. For example, electrode 104 on the back glass may be patterned in rows, while the electrode of the mechanical layer is patterned in columns, as seen in FIG. 8C. Of course, electrodes 104 and 108 need not be in a vertical or horizontal direction, but may be in at any angle from vertical and may deviate in path from a straight line, so long as the intersection of the electrodes occurs within a sufficiently finite area for acceptable touch recognition and resolution. Although for descriptive purposes the electrodes used to sense a touch are described in the context of a display, touch sensing can be achieved in any MEMS device by adding electrodes (104) at the back plate of the MEMS device. It should be understood that the present invention is not limited to display devices.

Display 100 may also comprise an insulator 106 between the mechanical layer and its electrode 108 and electrode 104 in embodiments where the deflection from a touch may result in contact of the mechanical layer and the electrode 104. Display 100 further comprises front (transparent) substrate 112 referred to hereafter as the IMOD substrate, seal 110, and absorber/oxide layer 114 which may, for example, be patterned in rows or columns or in other orientation. Substrate 112 may or may not be transparent, depending on the apparatus and the application. For example, in a MEMS device other than a display, substrate 112 may not be transparent.

As seen in FIG. 8B when an object such as a finger touches the IMOD substrate 112, it will deflect together with the absorber oxide 114 and the mechanical layer/electrode 108. This deflection, and the associated change in the gap between the mechanical layer electrode 108 or absorber/oxide layer 114 and electrode layer 104 results in a change in an electrical parameter that can be sensed in order to determine the location of the touch. Note also that deflection generated at the back glass may also be sensed, as such deflection also results in a change of capacitance or other parameter. Note that a touch may also be made and sensed through the back substrate 102 in FIG. 8 and that mechanical layer 108 may not contact layer 106. A touch made by finger, stylus or even localized pressure may be sensed.

Figure 8D:
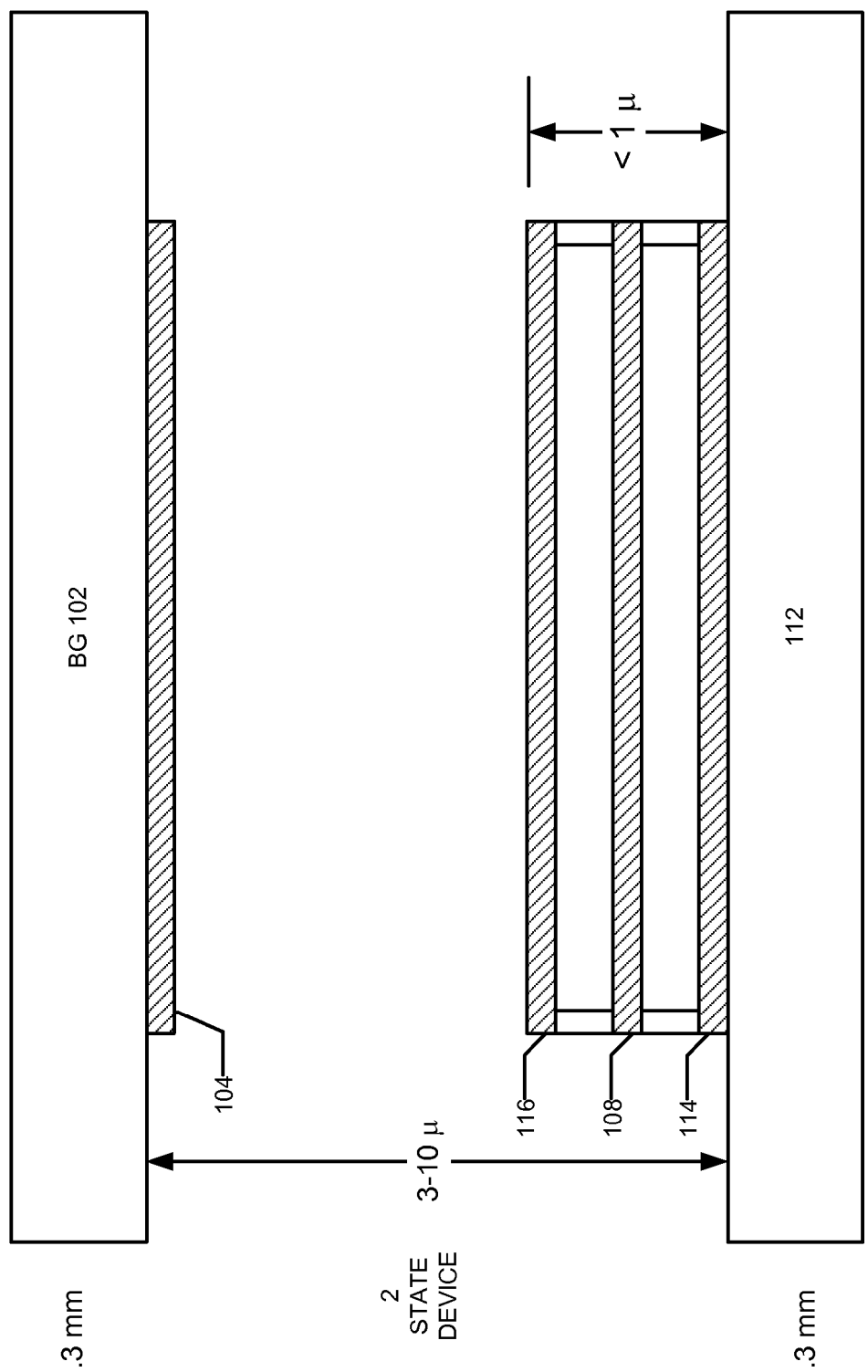
FIG. 8D is a cross section of a two state embodiment of an interferometric modulator.

FIG. 8D is a cross section of a two state embodiment of an interferometric modulator. This embodiment is referred to as "two state" because the mirrors of the mechanical layer 108 may be driven (e.g. pulled) towards either back glass 102 or IMOD substrate 112. In such an embodiment, the mirrors are driven towards the back glass 102 by top electrode/plate 116. The top electrode 116 is patterned in rows or columns or at another angle substantially orthogonal to the pattern of electrode 104 and thus may also be used to determine the location of a touch.

Figure 9A:
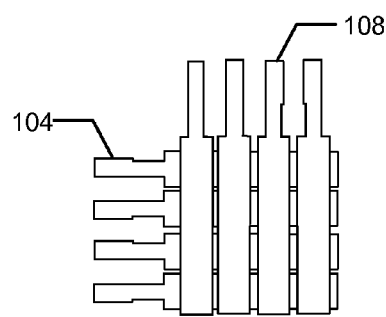
FIGS. 9A-9D are illustrations of embodiments of electrodes used in touch sensing.
Figure 9B:
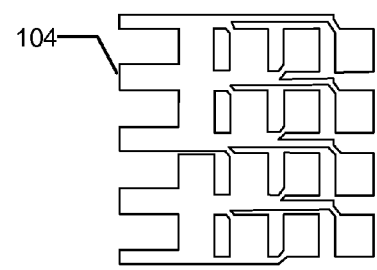
Figure 9C:
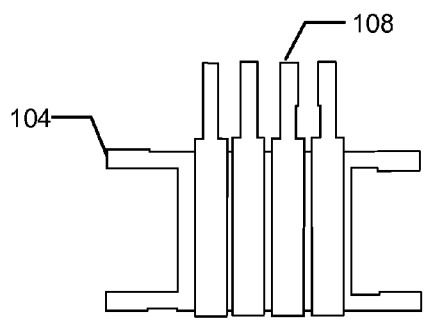
Figure 9D:
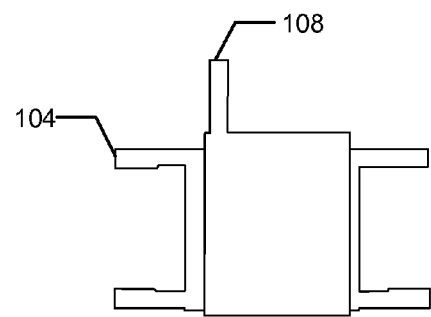

In one embodiment, the system senses the location of the touch by determining a change in capacitance at the intersection of the columns and rows or otherwise orthogonally oriented electrodes. Utilizing a processor of the system, embodiments compute the profile or shape of the deflected substrate by measuring capacitance at various locations and then comparing that shape with a model to compute the location of a touch. Such a display may be of a projected capacitive or surface capacitive nature. The embodiments shown in FIGS. 9A-D may be used to sense the touch area of interest, which may vary from the sub-pixel modulator scale to an entire screen or portion thereof. In one projected capacitive embodiment, because spatial resolution requirements for resolving a touch are much lower than the resolution of the display (and hence the electrodes of the mechanical or other layer) multiple adjacent mechanical lines may be connected together and sensed simultaneously, as seen in FIG. 9A. In another embodiment, a matrix of touch sensors on the back glass are used while the mechanical layer electrodes are used only to supply a common reference voltage, as seen in FIG. 9B. In surface capacitive embodiments the back glass layer may be a single conductor (electrode), rather than being patterned, as seen in FIG. 9C, and an n-probe measure may be used. For example, n may be four and thus a four probe measurement method is employed. In such an embodiment, patterned line electrodes of the mechanical layer are used to supply a reference voltage. Additionally, in embodiments where the IMOD display is a tri-state or a three dimensional analog IMOD device (with multiple sets of drive electrodes, as for example in FIG. 8D), a top plate of the device may be used to supply a reference voltage, as seen in FIG. 9D.

The centroid of the capacitance change may also be computed from measured capacitance data to improve touch sensing resolution and also to allow for multi touch (e.g. two or more fingers or other objects simultaneously) sensing. The centroid of capacitance change need not coincide with the location of the touch. For multi touch, superposition of the shape is a linear combination of the shapes resulting from the individual touches. A mapping between the centroid and touch location may be stored in memory, and referenced as needed. The mapping data can be based on mathematical (i.e. theoretical) calculations or on actual calibration values for a particular product line or individual display.

As an example, for a 3.5 inch panel and a six micron gap between the mechanical layer electrode and the back glass electrode, capacitance from the whole panel is approximately six nano farads. Assuming a two micron deflection occurs as the result of a touch, greater than one nanofarad total capacitance change may result, which is sufficiently detected by the described embodiments.

Other electrical parameters may also be used such as the resistance across the back glass electrode and/or electrode of the mechanical layer or absorber/oxide layer or an electrical circuit connected thereto. In such embodiments, the insulated layer between the electrodes is preferably not present.

Figure 10A:
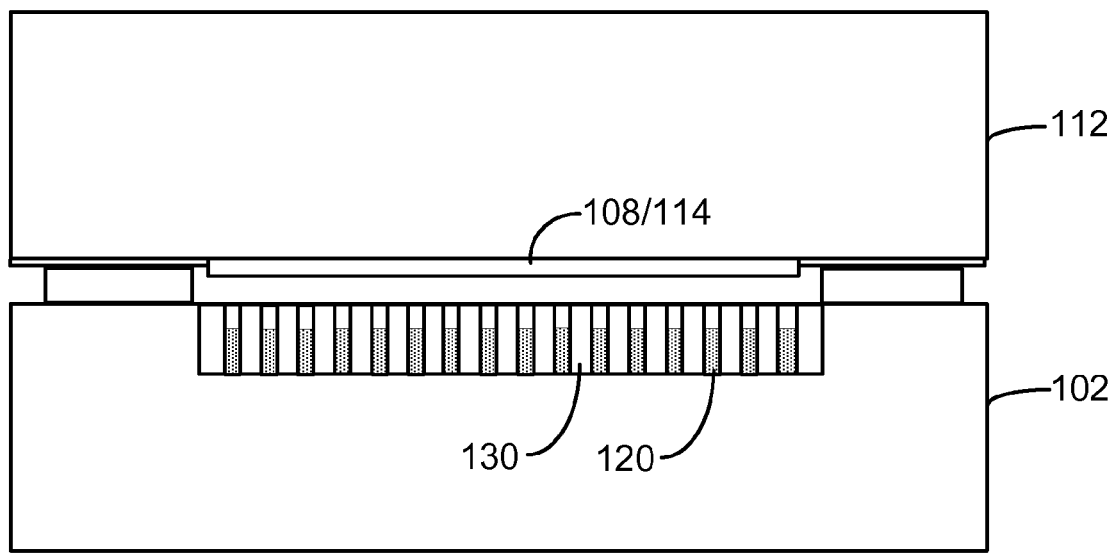
FIGS. 10A and 10B are cross sections of embodiments incorporating posts in a back glass of an interferometric modulator.
Figure 10B:
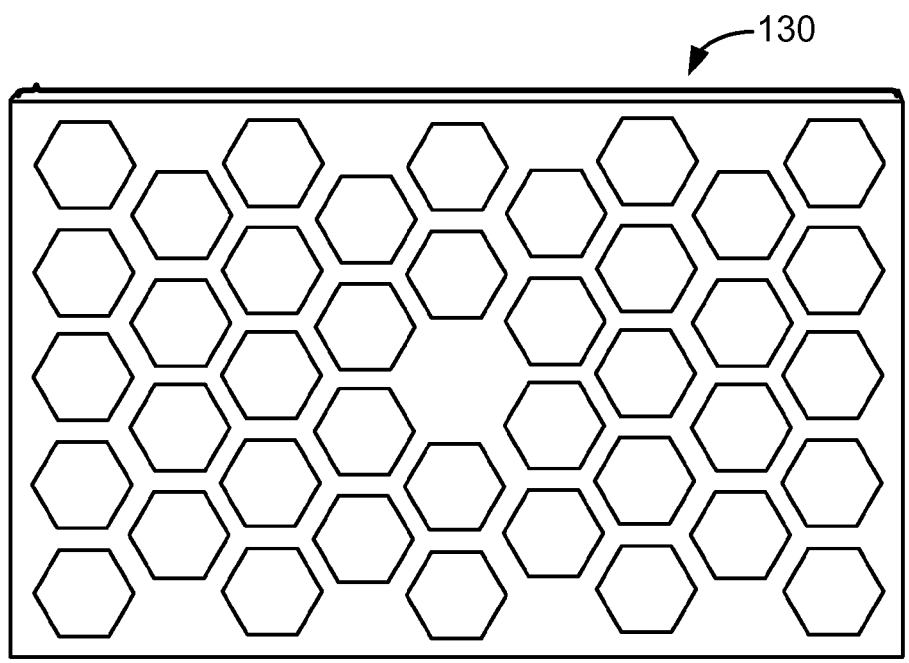

Referring to FIGS. 10A and 10B a group of posts 130 may be formed within back glass 102. Recesses 120 between the posts are filled with desiccant. A number of different geometric shapes and patterns may be used for the posts and resultant recesses. For example, an array of hexagons may be patterned such as that shown in FIG. 10B. Other geometric shapes may include circular, triangular, rectangular, pentagonal, octagonal columns etc. The back glass electrode 104 would be patterned to fit atop the posts and be interconnected in rows or columns or other orientations. Density may also be varied from center to edge to aid in detection and the panel edges, which are often more difficult to resolve than in the central portion of the display.

In certain embodiments, an appropriate insulator may be placed on top of the back glass electrode 104 to aid in capacitance detection as well as prevent wear of the mechanical layer. Examples of insulating layers would include silicon dioxide, liquid crystal polymer and Teflon etc.

Figure 11:
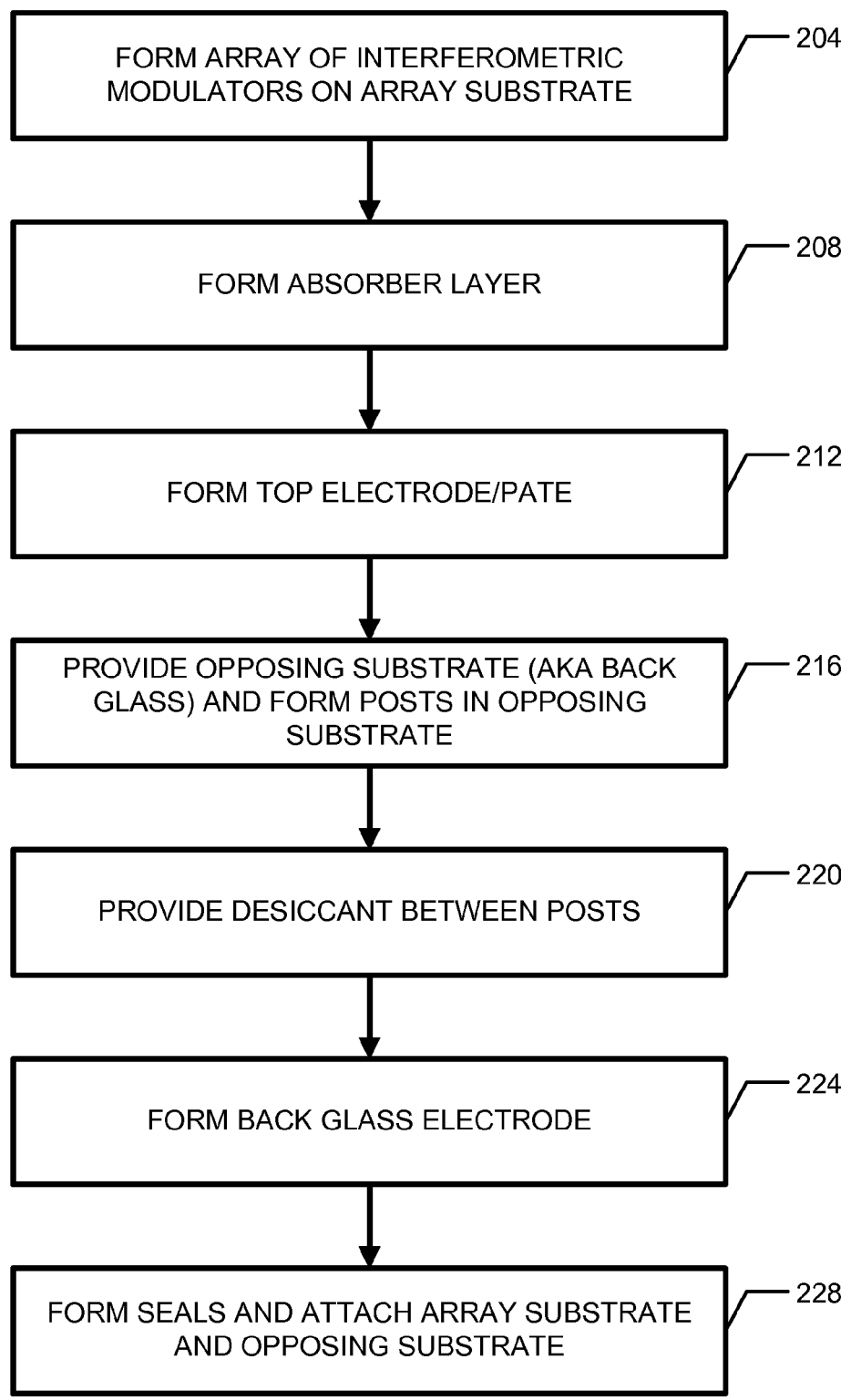
FIG. 11 is a flow chart depicting an overview of device fabrication.

FIG. 11 is a flow chart depicting an overview of device fabrication. The following steps are not necessarily in the order described. In step 204, the array of interferometric modulators is formed. Then in step 208, the absorber layer is formed, and in step 21 the top electrode/plate is formed in embodiments where present. In step 216 the posts in the back glass are formed and in step 220 the desiccant between the posts or present in other areas is provided. In step 224, the back glass electrode is formed, and in step 228, the seals are formed and the array substrate is attached to the back glass (opposing substrate).

While the invention has been particularly shown and described with reference to specific embodiments thereof, it will be understood by those skilled in the art that changes in the form and details of the disclosed embodiments may be made without departing from the spirit or scope of the invention.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. An apparatus, comprising:
    a first substrate;
    an array of microelectromechanical elements disposed on the first substrate;
    a first plurality of electrodes configured for conducting electrical signals to the array of microelectromechanical elements;

first control circuitry configured to apply electrical signals for controlling the array of microelectromechanical elements via the first plurality of electrodes;

a second substrate;

a second plurality of electrodes disposed on the second substrate; and second control circuitry configured to detect capacitance changes between the first plurality of electrodes and the second plurality of electrodes caused by a touch proximate the first substrate and to determine a location of the touch based at least in part on detected capacitance-changes.

2. The apparatus of claim 1, wherein the array of microelectromechanical elements comprises interferometric modulation elements, the interferometric modulation elements comprising two walls that define a cavity, one of the walls being movable relative to the other through a range of positions, the walls causing the cavity to operate interferometrically in at least one of the positions, producing a predetermined optical response to visible light.

3. The apparatus of claim 1, wherein the first substrate is substantially transparent.

4. The apparatus of claim 1, wherein the second control circuitry is further configured to compute a centroid of detected capacitance changes.

5. The apparatus of claim 1, wherein the second control circuitry is further configured to compute a centroid of a multi point touch.

6. The apparatus of claim 1, wherein the first plurality of electrodes is part of an optical stack disposed on the first substrate.

7. The apparatus of claim 1, wherein the first plurality of electrodes is adjacent the first substrate.

8. The apparatus of claim 7, wherein the first plurality of electrodes is located between the array of microelectromechanical elements and the first substrate.

9. The apparatus of claim 1, wherein multiple adjacent of the first plurality of electrodes are connected together and sensed simultaneously.

10. The apparatus of claim 1, wherein the apparatus comprises:
a display;
a processor that is configured to communicate with said display, said processor being configured to process image data; and
a memory device that is configured to communicate with said processor.

11. The apparatus as recited in claim 10, further comprising:
a driver circuit configured to send at least one signal to said display.

12. The apparatus as recited in claim 11, further comprising:
a controller configured to send at least a portion of said image data to said driver circuit.

13. The apparatus as recited in claim 10, further comprising:
an image source module configured to send said image data to said processor.

14. The apparatus as recited in claim 13, wherein said image source module comprises at least one of a receiver, transceiver, and transmitter.

15. The apparatus as recited in claim 10, further comprising:
an input device configured to receive input data and to communicate said input data to said processor.

16. An apparatus, comprising:
a first substantially transparent substrate;
an array of interferometric modulation elements disposed on the first substantially transparent substrate, the interferometric modulation elements comprising two walls that define a cavity, one of the walls being movable relative to the other through a range of positions, the walls causing the cavity to operate interferometrically in at least one of the positions, producing a predetermined optical response to visible light;

a first plurality of electrodes oriented along a first axis configured for conducting electrical signals to the array of interferometric modulation elements;

first control circuitry configured to apply electrical signals for controlling the array of interferometric modulation elements via the first plurality of electrodes;

a second plurality of electrodes oriented along a second axis substantially orthogonal to the first axis; and a touch screen apparatus configured for sensing a touch according to an associated change in resistance between electrodes of the first and second plurality.

17. A method of making an interferometric display apparatus, comprising:
forming a front substrate at a front of the display, the front substrate being substantially transparent;
forming a rear substrate at a rear of the display, the rear substrate being substantially transparent;
forming an array of interferometric modulation elements on the front substrate at the front of the display, the interferometric modulation elements comprising two walls that define a cavity, one of the walls being movable relative to the other through a range of positions, the walls causing the cavity to operate interferometrically in at least one of the positions, producing a predetermined optical response to visible light;
forming a first plurality of electrodes configured for conducting electrical signals to the array of interferometric modulation elements;
forming a second plurality of electrodes on the rear substrate; and
configuring a touch screen apparatus for sensing a change in capacitance between the electrodes of the first and second plurality and for determining a location of a touch according to the change in capacitance.

18. The method of claim 17, further comprising configuring the touch screen apparatus for computing a centroid of a multi point touch.

19. The method of claim 17, further comprising providing a plurality of posts within the rear substrate.

20. The method of claim 19, wherein the first plurality of electrodes are disposed atop the posts.

21. The method of claim 19, further comprising providing desiccant between the plurality of posts within the substrate.

22. A method of making an interferometric display apparatus, comprising:
forming an array of interferometric modulators on an array substrate;
providing a second substrate opposing the array substrate;
providing a matrix of touch sensors on the second substrate;
configuring the interferometric display apparatus to supply a reference voltage to an electrode of the array of interferometric modulators and to detect a change in capacitance between one of the matrix of touch sensors and the electrode of the array; and
attaching the array substrate and the opposing second substrate.

23. The method of claim 22, further comprising forming a top plate electrode.

24. The method of claim 22, further comprising forming posts within the second substrate and providing desiccant between the posts.

* * * * *